(12) United States Patent
Hart

(10) Patent No.: US 6,549,968 B1
(45) Date of Patent: Apr. 15, 2003

(54) CONTEXT TRANSFERRING BETWEEN PORTABLE COMPUTER PROCESSOR AND DOCKING STATION PROCESSOR UPON DOCKING AND UNDOCKING

(75) Inventor: Frank P. Hart, Apex, NC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,045

(22) Filed: Mar. 31, 2000

(51) Int. Cl.$^7$ .............................................. G06F 13/00
(52) U.S. Cl. ...................... 710/303; 712/228
(58) Field of Search ................. 710/300–304; 712/228; 361/681–686

(56) References Cited

U.S. PATENT DOCUMENTS 5,625,829 A * 4/1997 Gephardt et al. ............. 700/75
5,745,733 A * 4/1998 Robinson ..................... 709/209
6,438,622 B1 * 8/2002 Haghighi et al. .............. 710/1

\* cited by examiner

Primary Examiner—Sumati Lefkowitz
(74) Attorney, Agent, or Firm—Fish & Richardson P.C.

(57) ABSTRACT

A system for controlling operation of a computer includes a first processor in the computer and a second processor in a docking station. The first and second processors shift a context for controlling the computer between the computer and the docking station based on detecting an event relating to docking. If the context is shifted to the computer in response to undocking, the first processor controls the computer and the second processor halts operation. If the context is shifted to the docking station in response to docking, the second processor controls the computer and the first processor halts operation.

27 Claims, 3 Drawing Sheets

CONTEXT TRANSFERRING BETWEEN PORTABLE COMPUTER PROCESSOR AND DOCKING STATION PROCESSOR UPON DOCKING AND UNDOCKING

BACKGROUND OF THE INVENTION

This invention relates to controlling operation of a computer in a docking station.

A computer, such as a notebook computer, mates to a docking station to take advantage of peripherals coupled to the docking station. For example, the docking station may provide a large screen monitor and offer access to devices such as printers, scanners, and digital cameras. The docking station may also provide ready access to a local area network (LAN) or other networking capabilities.

DESCRIPTION

Figure 1:
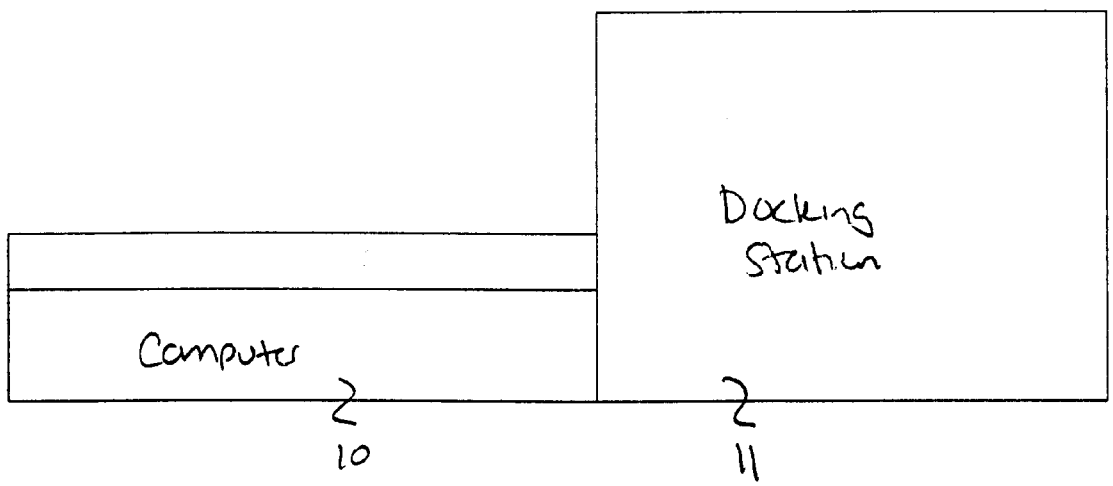
FIG. 1 is a side view of a computer coupled to a docking station.

FIG. 1 shows a notebook computer 10 mated to a docking station 11. A connector (not shown) provides a symbiotic link between a high-speed bus on computer 10, such as an IDE (Integrated Drive Electronics) bus, and a corresponding high-speed bus on docking station 11. Data and commands are exchanged between computer 10 and docking station 11 over this high-speed bus.

Figure 2:
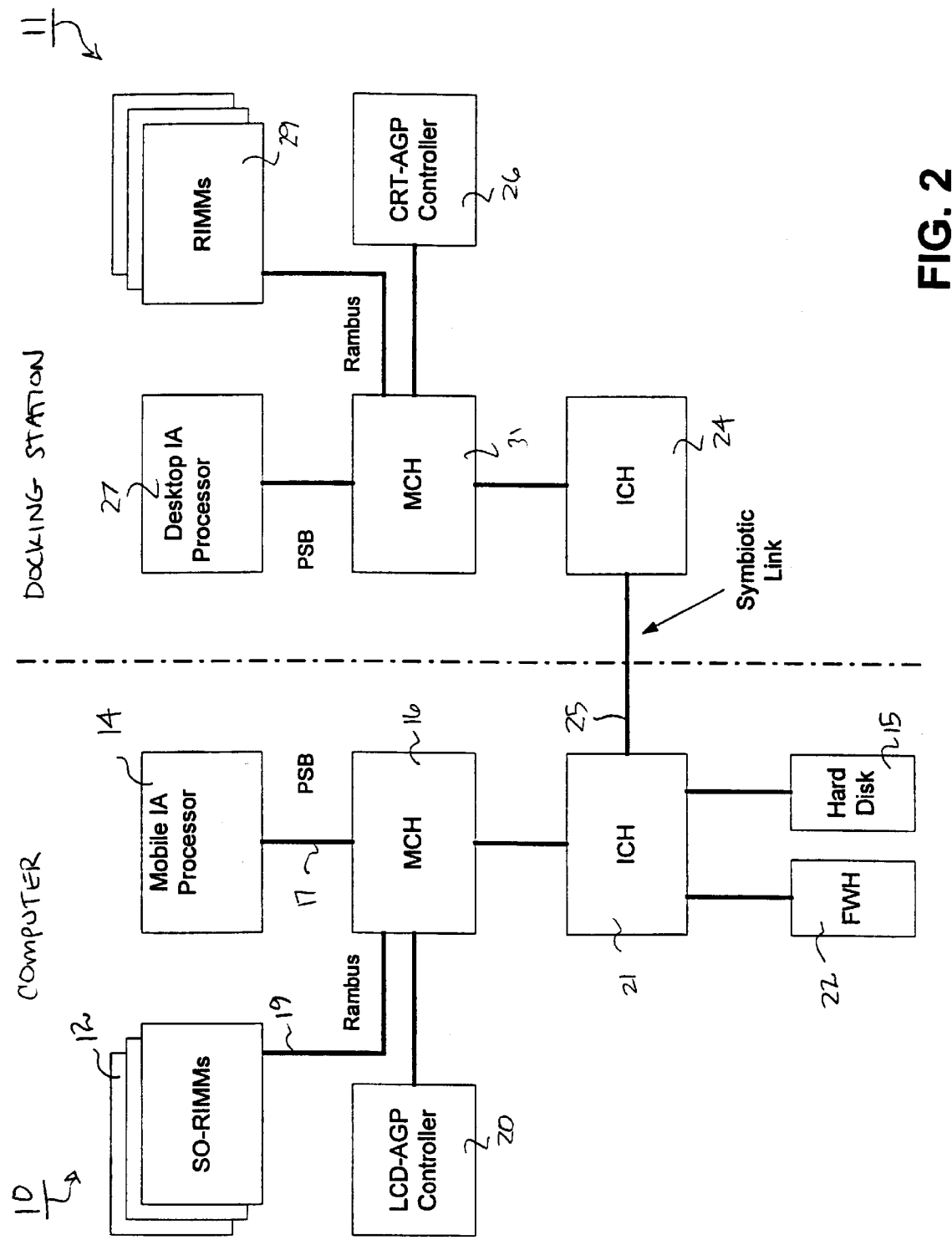
FIG. 2 is a block diagram of electronic components in the computer and the docking station.

A block diagram of components of computer 10 and docking station 11 is shown in FIG. 2. Included on computer 10 are SO-RIMMs 12 (Small Outline RAMBUS In-Line Memory Modules), which provide temporary storage for data and for executing programs. Processor 14 is a microprocessor or other device that is capable of executing computer programs stored, e.g., on hard disk 15. One type of processor that may be used is a Mobile IA (Intel Architecture) processor, such as a Pentium III mobile processor.

Processor 14 is connected to memory control hub (MCH) 16 via a bus 17, such as a processor side bus (PSB). SO-RIMMs 12 are also connected to MCH 16 via a bus 19, such as a RAMBUS. MCH 16 arbitrates access to SO-RIMMs 12 by processor 14 and, as described below, a processor on docking station 11. Liquid Crystal Display—Accelerator Graphics Port (LCD-AGP) controller 20 controls outputs to an LCD display screen (not shown) on computer 10.

Input/output control hub (ICH) 21 relays communications and data between MCH 16, hard disk 15, firmware hub (FWH) 22, and a corresponding ICH 24 on docking station 11. For example, requests for data from hard disk 15 go through ICH 21, as do communications between computer 10 and docking station 11 over high-speed bus 25. ICH 21 also controls cycles and access to channels on high-speed bus 25 to allow docking station 11 to access data on hard disk 15 and BIOS (Basic Input/Output System) code stored on FWH 22. Thus operation of computer 10 is controlled via data and programs on hard disk 15 regardless of whether computer 10 is docked and regardless of whether computer processor 14 or the docking station processor 27 controls computer 10.

The architecture of docking station 11 is similar to that of computer 10, as shown in FIG. 2. Docking station 11, however, does not include a hard disk or FWH, since it uses hard disk 15 and FWH 22 when computer 10 is docked. Also, instead of an LCD-AGP controller, docking station 11 uses a CRT-AGP (Cathode Ray Tube—Accelerator Graphics Port) controller 26. Its functions are similar to that of LCD-AGP controller 20, except that it controls display on a CRT rather than an LCD.

Processor 27 in docking station 11 generally has more capability than processor 14 of computer 10. For example, processor 27 may have access to more memory. Processor 27 may also be faster than processor 14 and include more functionality in general. The docking station also has additional space (i.e., volume) in which to store computer memory. Processor 27 may be a Desktop IA processor, such as a Pentium III desktop processor. When computer 10 is mated to docking station 11, processor 14 relinquishes control over computer 10 and processor 27 takes over control of computer 10, as described in detail below. As a result, a user of computer 10 is given access to the added capability of processor 27 on docking station 11.

In computer 10 and docking station 11, the context, or state, of respective processors 14 and 27 is stored in registers or other memory devices. For example, the context may include states of currently-executing programs in SO-RIMMs 12 or RIMMs 29, the state of the operating system on processor 14 or 27, data in a cache of processor 14 or 27, and/or other operational information stored elsewhere within computer 10 and/or docking station 11. Only one processor has a valid context at any one point in time, since only one processor is used to control the docking station/computer at a point in time. Processors 14 and 27 can obtain their respective contexts by retrieving the information from the relevant components. The context may include the processor's operating system and the contents of any hardware registers on the appropriate device(s).

Figure 3:
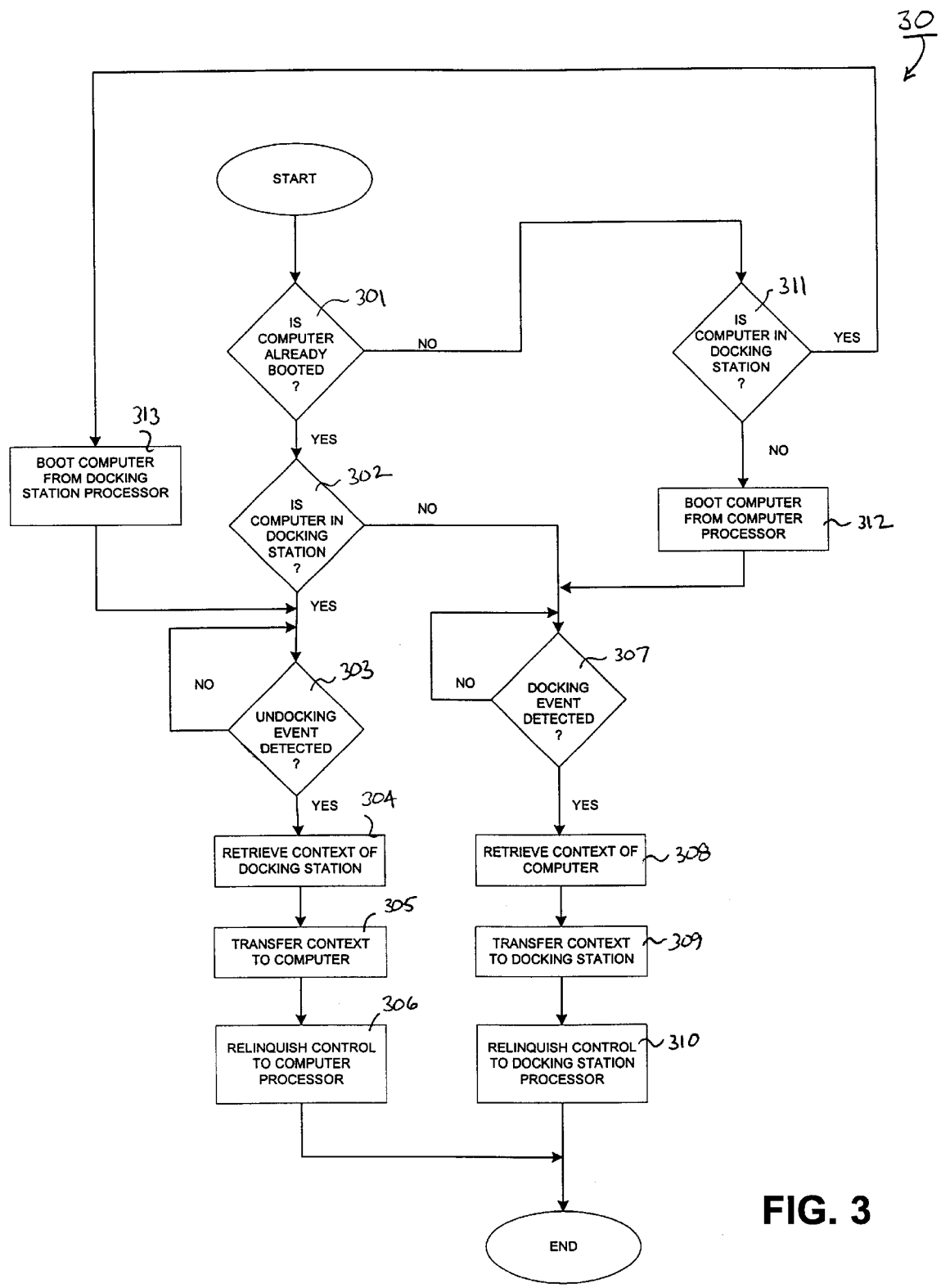
FIG. 3 is a flow diagram showing a process, according to one embodiment of the invention, for controlling the computer from either a processor in the computer or a processor in the docking station.

FIG. 3 shows a process 30 for controlling computer 10 based on whether computer 10 is docked in docking station 11 and when computer 10 was activated (or "booted"). To begin, if computer 10 is already booted (301), and if computer 10 is already docked in docking station 11 (302), firmware in computer 10, such as the BIOS code stored in FWH 22, waits for and detects (303) an "undocking" event. An undocking event is an indication that computer 10 is about to be removed from docking station 11. The undocking event may be detected based on information input to the computer, e.g., in the Windows operating system, which indicates that the computer is about to be removed from the docking station.

Once computer 10 determines that an undocking event has occurred, processor 27 retrieves (304) its current context from registers stored in the components of docking station 11. This context may be retrieved from SO-RIMMs 29, internal cache of processor 27, and other memory devices located throughout docking station 11.

Processor 27 transfers (305) its current context to computer 10 via high-speed bus 25. The context is received by ICH 21 and transferred to processor 14 and/or appropriate memory devices on computer 10. Processor 27 then relinquishes (306) control over computer 10 to processor 14 in computer 10 and halts operation. Processor 14 assumes control over the functions and components of computer 10, including any computer programs currently running on computer 10. These computer programs can thus resume operation through processor 14 at roughly the same point at which they were operating on processor 27 with little interruption, resulting in a relatively seamless transfer of control.

Returning to 302, if computer 10 is not in docking station 11, and a docking event is detected (307), the context of processor 14 is transferred to docking station 11. This is the opposite of above, where the context of processor 27 was transferred to computer 10. Firmware running on processor 14 on computer 10, such as the BIOS code from FWH 22, controls this process. Process 30 detects (307) the docking event, such as the presence of computer 10 in docking station 11. In response, processor 14 retrieves (308) its current context from registers stored in the components of computer 10. This context may be retrieved from RIMMs 12, MCH 16, internal cache of processor 14, and other memory devices located on computer 10.

Processor 14 transfers (309) its current context to docking station 11 via high-speed bus 25. The context is received by ICH 24 and transferred to processor 27 and/or appropriate memory devices on docking station 11. Processor 14 then relinquishes (310) control over computer 10 to processor 27 and halts operation. Processor 27 assumes control over the functions and components of computer 10. Thus, computer programs previously executing on processor 14 can resume operation on processor 27 at roughly the same point with little interruption, again relatively seamlessly.

Docking station 11 also continues to make use of input/output (I/O) devices on computer 10, such as a keyboard and a mouse (not shown). Data from these devices is transferred through ICH 21 to docking station 11 via high-speed bus 25. Docking station 11 also maintains access to hard disk 25 on computer 10 as additional storage.

Returning to 301, if computer 10 is not already booted (311), and computer 10 is in docking station 11 (313), processor 27 boots computer 10 and docking station 11, since processor 27 has greater capability than processor 14. Generally speaking, whichever processor has greater capability is used to boot computer 10 and docking station 11. Thereafter, flow proceeds to 303, where process 30 waits for an undocking event to occur.

Returning to 311, if computer 10 is not already in docking station 11, processor 14 is used to boot (312) computer 10 (since there is no physical, logical, or electrical connection between processor 27 and computer 10 at this point). Thereafter, flow proceeds to 307, where process 30 waits for a docking event to occur.

The invention is not limited to use with the particular hardware and software configurations described above. For example, the functions of the ICHs and MCHs could be combined into a single device on each of computer 10 and docking station 11. Buses other than IDE buses may be used. For example a USB (Universal Serial Bus) and a PCI (Peripheral Component Interface) maybe used to couple computer 10 to docking station 11.

Other embodiments not described herein are also within the scope of the following claims.

What is claimed is:

1. A method of controlling a computer in a docking station, comprising:
   receiving a context of a first processor in the computer at the docking station;
   controlling the computer using a second processor on the docking station and the context of the first processor; and
   halting operation of the first processor.

2. The method of claim 1, wherein the context of the first processor is received in response to detecting a docking event.

3. The method of claim 1, wherein the context of the first processor resides in one or more memory devices on the computer and is transferred to one or more memory devices on the docking station.

4. The method of claim 1, wherein the context of the first processor is received over a symbiotic link between the computer and the docking station.

5. The method of claim 1, wherein the second processor has greater capability than the first processor.

6. A method of controlling operation of a computer using a docking station, comprising:
   receiving a context of a first processor in the docking station at the computer;
   controlling the computer using a second processor on the computer and the context of the first processor; and
   halting operation of the first processor with respect to the computer.

7. The method of claim 6, wherein the context of the first processor is received from the docking station in response to detecting an undocking event.

8. A method of controlling operation of a computer, comprising:
   shifting a context between the computer and a docking station for the computer based on detecting an event relating to docking; and
   controlling the computer using the context;
   wherein:
   if the context is shifted to the computer, a processor in the computer controls the computer and a processor in the docking station halts operation; and
   if the context is shifted to the docking station, the processor in the docking station controls the computer and the processor in the computer halts operation.

9. The method of claim 8, wherein the context resides in one or more memory devices on either the computer or the docking station.

10. An article comprising a computer-readable medium which stores computer executable instructions for controlling a computer, the instructions causing a docking station to:
    receive a context of a first processor in the computer;
    control the computer using a second processor on the docking station and the context of the first processor; and
    halt operation of the first processor.

11. The article of claim 10, wherein the context of the first processor is received in response to detecting a docking event.

12. The article of claim 10, wherein the context of the first processor resides in one or more memory devices on the computer and is transferred to one or more memory devices on the docking station.

13. The article of claim 10, wherein the context of the first processor is received over a symbiotic link between the computer and the docking station.

14. The article of claim 10, wherein the second processor has greater capability than the first processor.

15. An article comprising a computer-readable medium which stores computer-executable instructions for controlling operation of a computer using a docking station, the instructions causing the computer to:
    receive a context of a first processor in the docking station at the computer;

control the computer using a second processor on the computer and the context of the first processor; and halt operation of the first processor with respect to the computer.

16. The article of claim 15, wherein the context of the first processor is received from the docking station in response to detecting an undocking event.

17. An article comprising a computer-readable medium which stores computer-executable instructions for controlling operation of a computer, the instructions causing the computer to:

shift a context between the computer and a docking station for the computer based on detecting an event relating to docking; and control the computer using the context;

wherein:

if the context is shifted to the computer, a processor in the computer controls the computer and a processor in the docking station halts operation; and if the context is shifted to the docking station, the processor in the docking station controls the computer and the processor in the computer halts operation.

18. The article of claim 17, wherein the context resides in one or more memory devices on either the computer or the docking station.

19. A system for controlling a computer in a docking station, comprising:

a first processor which transfers a context of the first processor to the docking station and thereafter halts operation; and a second processor on the docking station which controls the computer using the context of the first processor.

20. The system of claim 19, wherein the first processor detects a docking event and transfers the context in response to detecting the docking event.

21. The system of claim 19, wherein the context of the first processor resides in one or more memory devices on the computer and is transferred to one or more memory devices on the docking station.

22. The system of claim 19, wherein the context of the first processor is transferred over a symbiotic link between the computer and the docking station.

23. The system of claim 19, wherein the second processor has greater capability than the first processor.

24. A system for controlling operation of a computer using a docking station, comprising:

a first processor in the docking station which transfers a context of the first processor to the computer and thereafter halts operation with respect to the computer; and a second processor in the computer which receives the context from the first processor and which controls operation of the computer using the context of the first processor.

25. The system of claim 24, wherein the second processor receives the context of the first processor from the docking station in response to detecting an undocking event.

26. A system for controlling operation of a computer, comprising:

a first processor in the computer; and a second processor in a docking station;

wherein the first and second processors shift a context for controlling the computer between the computer and the docking station based on detecting an event relating to docking, and wherein:

if the context is shifted to the computer, the first processor controls the computer and the second processor halts operation; and if the context is shifted to the docking station, the second processor controls the computer and the first processor halts operation.

27. The system of claim 26, wherein the context resides in one or more memory devices on either the computer or the docking station.

* * * * *